United States Patent [19]

Malm et al.

[11] Patent Number: 4,702,001

[45] Date of Patent: Oct. 27, 1987

[54] PLIERS FOR RETAINING RINGS

[75] Inventors: Rune Malm, Konigstein; Radu Mihalcea, Huckelhaven, both of Fed. Rep. of Germany

[73] Assignee: Seeger-Orbis GmbH, Schweinfurt, Fed. Rep. of Germany

[21] Appl. No.: 852,655

[22] Filed: Apr. 16, 1986

[30] Foreign Application Priority Data

Apr. 16, 1985 [DE] Fed. Rep. of Germany ....... 3513585

[51] Int. Cl.[4] .............................................. B23P 19/08

[52] U.S. Cl. .......................................... 29/720; 29/229

[58] Field of Search .................... 81/486; 29/229, 222, 29/709, 228, 720, 243.56

[56] References Cited

U.S. PATENT DOCUMENTS

| | | | |
|---|---|---|---|
| 2,441,846 | 5/1948 | Schaaff et al. | 29/229 |
| 2,518,142 | 8/1950 | Huntington | 29/229 |
| 3,483,606 | 12/1969 | Ethridge | 29/229 |
| 3,762,020 | 10/1973 | Plouffe | 29/229 |

FOREIGN PATENT DOCUMENTS

| | | | |
|---|---|---|---|
| 1947498 | 10/1966 | Fed. Rep. of Germany . | |
| 267761 | 7/1950 | Switzerland | 29/229 |
| 804483 | 11/1958 | United Kingdom | 29/229 |
| 872242 | 10/1981 | U.S.S.R. | 29/229 |
| 1117179 | 10/1984 | U.S.S.R. | 29/229 |

*Primary Examiner*—Roscoe V. Parker
*Attorney, Agent, or Firm*—Eugene E. Renz, Jr.

[57] ABSTRACT

Pliers for installing retaining rings comprising a pair of levers connected to each other by a sleeve bearing. Each lever has an actuating shank on one side of the sleeve bearing and a tool shank engageable with the retaining ring on the other side of the sleeve bearing. One of the tool shanks is connected by way of the sleeve to one of the actuating shanks and the other tool shank is connected by way of the shaft of the sleeve bearing to the other acutating shank.

3 Claims, 3 Drawing Figures

PLIERS FOR RETAINING RINGS

FIELD OF THE INVENTION

The present invention relates to pliers for installing retaining rings or the like.

BACKGROUND OF THE INVENTION

Pliers, which are hand-actuated tools used for installing retaining rings in holes, on shafts or axles and the like, are well known. These pliers usually comprise an actuating shank having a portion which extends beyond the joint as a tool shank terminating at its free end in projections which fit the retaining ring so that the tool shank can engage therein to expand or contract it. These projections are typically in the form of pins, for example, which engage in corresponding mounting holes on the free terminal ends of the horshoe-shaped retaining ring. In some instances, the tool shank of the pliers is offset or bent at an angle for ease of operation and also to provide a means for inserting retaining rings into bore openings or the like. However, if it is desired to assemble a retaining ring in a relatively deep hole or opening having a groove relatively far away from the edge of the opening, then it is necessary for the pliers to have tool shanks with a correspondingly long, bent portion. In this case, however, the tensioning capacity of the pliers is considerably reduced because the tool shanks must be bent sharply by reason of their considerable length. Even if it is possible to tension the retaining ring in the first place, there is considerable danger that it will slip from the projections. Furthermore, it is no longer possible to observe the orientation of the retaining ring in the opening so that snapping the ring into the intended groove is oftentime a time consuming process of trial and error.

To solve this problem, various types of tensioning devices have been proposed. For example, West German Utility Model No. 1,947,498 shows a mounting mandrel having clamping jaws which surround the retaining ring on all sides. These jaws contract radially around conical surfaces and release the retaining ring by means of an ejector which moves in an axial direction. Even though mounting positions which are located in very deep openings can be reached by this arrangement, it is impossible to monitor the snapping in of the retaining ring into its intended groove by reason of the fact that with this design there is no automatic feed-back from the position of the plier levers as there is with the conventional type of pliers indicating that the retaining ring is snapped into place.

With the foregoing in mind, it is an object of the present invention to provide pliers characterized by novel features of construction and arrangement whereby it is easy to introduce retaining rings even into mounting position which are relatively remote from the edge of an opening.

The present invention overcomes the drawbacks of the prior art and provides solution to the problems discussed above by reason of the fact that the device is designed as a sleeve bearing having considerable axial length wherein one of the tool shanks is connected to one of the actuating shanks by way of the sleeve and the other tool shank is connected to the other actuating shank by way of the shaft of the sleeve bearing. By this arrangement, it is possible to transmit the tensioning force advantageously in a rigid manner from the actuating shanks to the tool shanks even when the tool shanks are spaced a considerable distance from the actuating shanks. The sleeve bearing consists of a shaft and a sleeve which rotates on the shaft, both parts being subjected to torsion when the retaining ring is tensioned. In this fashion, the tool shanks are not subjected to any bending force and provide stable transmission elements for the tensioning forces which are at least equal to that of a compact pliers of known design. Further, the sleeve bearing can be made with a comparatively small diameter so that the pliers, in accordance with the present invention, are suitable for assembling retaining rings in bores of extremely small size. In accordance with the design of the present invention, it is possible to operate the actuating shanks either manually or by simple modification by automatic machine means.

In accordance with another feature of the present invention, the tool shanks are in the form of disks having axial projections which fit the retaining ring thereby to engage with it. At least one of the tool shanks may be provided with a radial support surface for the retaining ring which is preferably located diameterically opposite the axial projections. The disk-shaped configuration of the tool shanks provides a particularly stable and positionally rigid assembly facilitating tensioning of the retaining ring reliably without the danger of its slipping off. The particular configuration of the support surface provides significant advantages since the retaining ring rests on at least three points about its circumference. Accordingly, when it is being guided into an opening, it remains oriented in the desired radial direction required for it to be snapped securely into a groove.

In accordance with another feature of the present invention, the pliers are provided with a gauge device for indicating the installation position of the retaining ring. This gauging device may consist, for example, of a sensor which is located near the tool shank and which transmits a signal when the desired installation position for the retaining ring has been reached. Alternatively, it can be formed by a feeler which is free to move axially with respect to the tool shanks and which is supported elastically against them and runs against the end surface of the machine element to be secured. The sensing surface of the feeler may be formed by a disk with an outer diameter smaller than the bore diameter of the tensioned retaining ring and can be connected to a bolt which is free to move axially in the shaft and which, therefore, emerges near the actuating levers and in this fashion indicates the installation position. The gauge device facilitates easier location of the installation position and accordingly, installation is rendered highly efficient particularly in the case of grooves which are located at as great depth in the opening in a position where it is no longer possible to observe the ring being introduced. With the pliers according to the present invention, they are simply positioned into the opening until the gauge device generates a signal displayed in an external visible location. In this position, the tensioning force is reduced which causes the retaining ring to snap in place. In the very simple design with bolts, the end of the bolt emerges from the shaft when the disk near the tool shank is pushed in the axial direction. This happens when the disk with its front end sensing surface is pushed, for example, against the end surface of a machine part to be secured axially.

The sensor may comprise an electrical/electronic sensor with optical display. The lamp, for example, connected to a contact sensor or to a sensor operating electronically signals the proper installation position.

SUMMARY OF THE INVENTION

In the pliers for retaining rings according to the invention, the actuating shanks are connected by way of a sleeve bearing of considerable axial length to the tool shanks. Thus, the reliable installation of retaining rings in deep mounting holes is made possible. In addition, a support surface for the static, secure, axial retention of the retaining ring is provided. A sensing surface indicates when the installation position has been reached by means of a bolt which emerges from the other side of the pliers.

BRIEF DESCRIPTION OF THE DRAWINGS

These and other objects of the present invention and the various features and details of the operation and construction thereof are hereinafter more fully set forth with reference to the accompanying drawings, wherein.

DESCRIPTION OF THE PREFERRED EMBODIMENT

Figure 1:
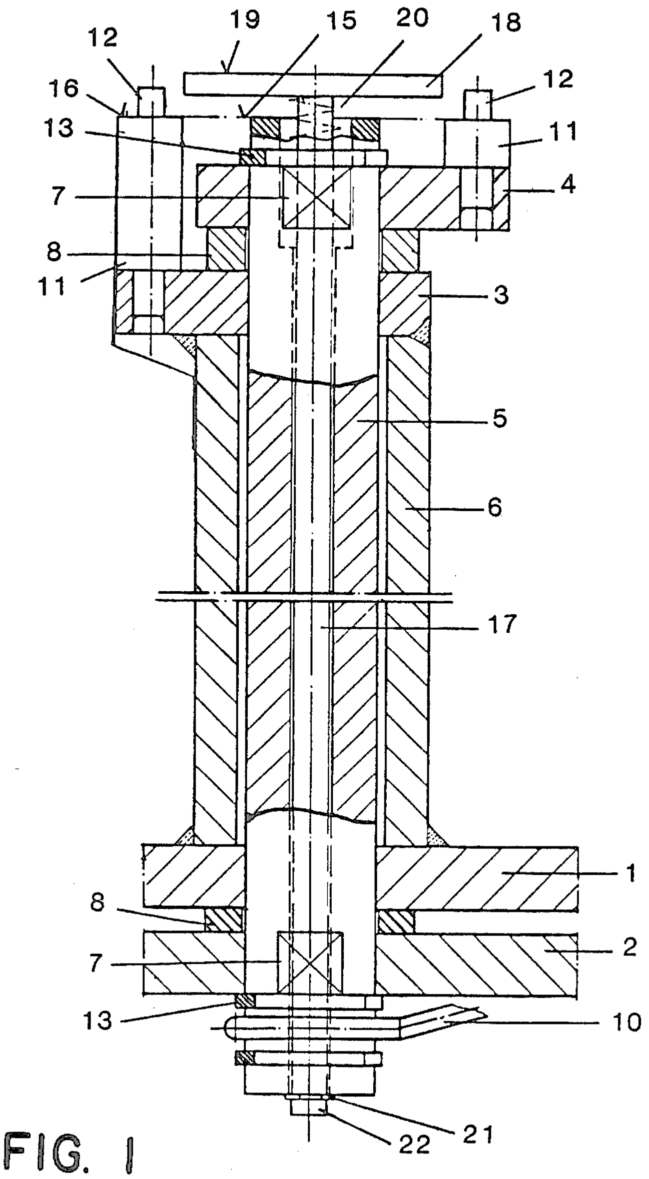
FIG. 1 is a longitudinal sectional view of pliers constructed in accordance with the present invention incorporating a sleeve bearing and a signal bolt.

Referring now to the drawings and particularly to FIG. 1 thereof, there is shown a plier assembly for mounting retaining rings constructed in accordance with the present invention. The plier assembly consists of a sleeve bearing having actuating shanks 1, 2 mounted at one axial end and tool shanks 3, 4 mounted adjacent the opposite axial end. As illustrated, the sleeve bearing consists of an elongated hollow shaft member 5 rotatably supported in a bore 1a in the inner actuating shank 1 and in a corresponding bore 3*a* of inner tool shank 3 at the opposite end. The shanks 1, 3 are rigidly attached to each other by means of a sleeve 6 which circumscribes the hollow shaft member. Accordingly, outer acutating shank 2 and outer tool shank 4 are non-rotatably connected by way of flat surface 7 to hollow shaft 5 in a positive form-locking manner. The actuating shanks 1, 2 and tool shanks 3, 4 are held a predetermined distance apart by spacers 8 to provide freedom of rotation relative to shanks 1, 3 connected to sleeve 6 and are secured axially on hollow shaft 5 by retaining rings 13. Note that actuating shanks 1, 2 (handles) are not shown in their full length to permit illustration of the essential components of the pliers on a larger scale. The actuating shanks 1, 2 are actuatable towards one another against the force of a spring 10. Similarly, the break in the center of the sleeve bearings indicates that the axial length of the pliers can be selectively varied and adapted to the requirements needed.

Figure 2:
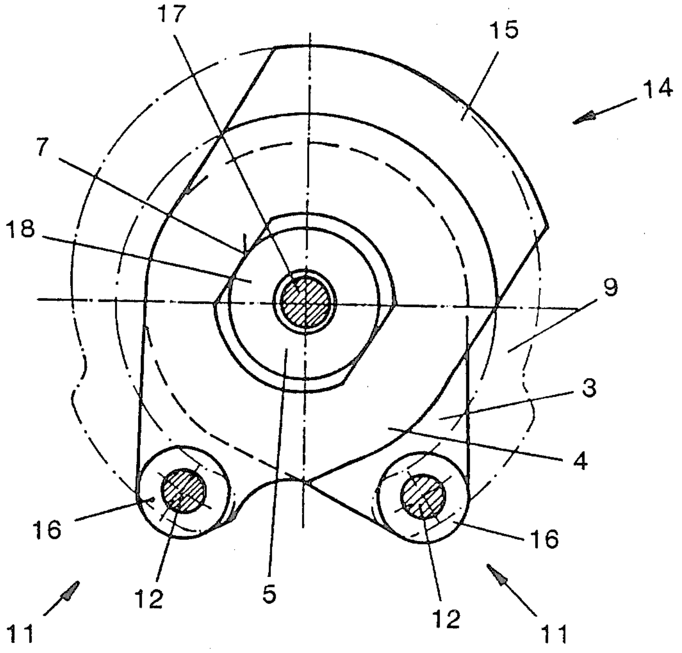
FIG. 2 is a side view adjacent the tool shanks of the pliers shown in FIG. 1 showing a retaining ring in an untensioned state.
Figure 3:
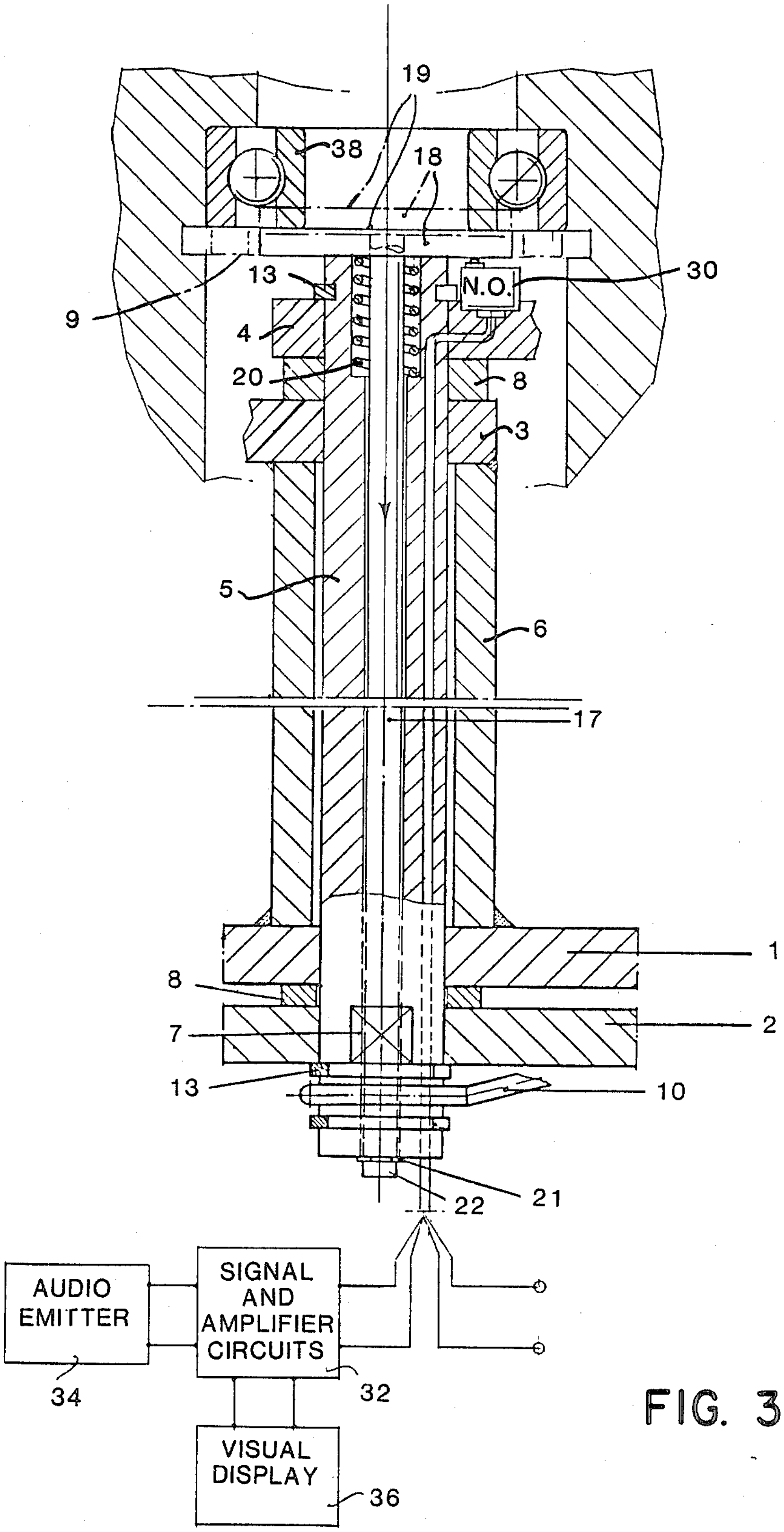
FIG. 3 is a longitudinal sectional view showing the pliers in use installing a retaining ring interiorly of the bore to retain a machine part in place and schematically illustrating an electrical sensing means and displays.

Tool shanks 3, 4 are, as can be seen readily in FIG. 2, essentially disk-shaped and are provided with bolts 11 radially at a certain distance from the central axis which extend in the axial direction. The bolts 11 have pin-like projections 12 at their free ends which engage in corresponding installation openings 9*a* in the retaining ring 9 to be installed. (Retaining ring 9 is indicated in broken lines in FIG. 2) Tool shank 4 connected to hollow shaft 5 extends radially on the side diametrically opposite the associated bolt and has an axial projection 14 shown in FIG. 2 in the shape of a segment of a ring which serves as a support surface 15 for the retaining ring 9. This support surface 15 is shown as a broken line on the same level as the support surfaces 16 on the bolt side. By this arrangement, retaining ring 9 rests without movement in the radial plane. Accordingly, when actuating shanks 1, 2 are operated like a pliers, the pin-shaped projections 12 of bolts 11 move toward each other and pull retaining ring 9 radially inwardly to tension it before it is introduced into a mounting opening (not shown). A bolt 17 is mounted in hollow shaft 5 which is free to move in the axial direction and which mounts a circular disk 18 with a sensing surface 19 on its front end adjacent the tool shanks 3, 4. Between disk 18 and the bottom of a blind expanded hole 5*b* in hollow shaft 5, there is a pretensioned coil spring 20 which provides disk 18 with a rest position some distance away from the hollow shaft 5. Bolt 17 projects slightly but to a visible extent from hollow shaft 5 near actuating shanks 1, 2 and is secured axially with a retaining ring 21.

In accordance with the present invention, the pliers may be provided with a gauging device for indicating the installation position of the retaining ring 9. This gauging device may consist, for example, of a sensor, in the present instance a normally open micro switch 30, which is located near the tool shank 4 which is energized when gauging disk 18 is fully depressed and which then transmits a signal to a signal and amplifier circuit 32 to indicate when the desired installation position for the retaining ring has been reached. The output signal from circuit 32 may be utilized to energize a sound emitter device 34 or a visual display 36.

Considering now the use of the pliers to install a retaining ring, when retaining ring 9 has been contracted and introduced by the pliers into the mounting hole, disk 18 comes to rest against the end surface of the machine part (not shown) to be secured in the axial direction. As the pliers are inserted further into the hole, disk 18 is pushed against the end surface of hollow shaft 5 whereby the other end of bolt 17 emerges and in this way indicates that the installation position has been reached. Disk 18 has the same thickness as retaining ring 9 and accordingly, when firm contact is made with the machine part 38, the correct installation position radially with respect to the groove is ensured. When actuating shanks 1, 2 are released, retaining ring 9 snaps gently into the groove and the angular position of the actuating shanks 1, 2 indicates the desired snap-in state. Thereafter, the pliers can be removed.

While a particular embodiment of the invention has been illustrated and described herein, it is not intended to limit the inventio, and changes and modifications may be made therein within the scope of the following claims.

What is claimed is:

1. Device for installing retaining rings comprising a pair of levers connected to each other by connecting means, each lever having an actuating shank (1,2) on one side of the connecting means and each having a tool shank (3,4) engageable with the retaining ring on the other side of the connecting means, said connecting means comprising a sleeve bearing (5,6) wherein one of the tool shanks (3) is connected by way of the sleeve (6) to one of the actuating shanks (1) and the other tool shank (4) is connected by way of the shaft (5) of the sleeve bearing to the other actuating shank (2) and a gauge device operable to indicate the installation position for the retaining ring (9), consisting of a sensor, which is located near the tool shanks (3,4) and which transmits a signal when the installation position intended for the retaining ring (9) is reached, said gauge device being formed by a feeler which is free to move axially with respect to the tool shanks (3,4), which is elastically supported against them, and which runs against the end surface of the machine element to be retained.

2. Device according to claim 1, wherein a sensing surface (19) of the feeler is formed by a disk (18) with an outer diameter which is smaller than the diameter of the bore of the tensioned retaining ring (9).

3. Device according to claim 1, wherein a sensing surface (19) of the feeler is connected to a bolt (17), which is free to move axially in the shaft (5), which emerges near the actuating shanks (1,2), and which indicates the installation position.

* * * * *